US012448132B2

(12) United States Patent
Shivappa et al.

(10) Patent No.: US 12,448,132 B2
(45) Date of Patent: Oct. 21, 2025

(54) SLIDE PACK GROWTH DETECTION METHOD OF EVACUATION SLIDES OR SLIDE/RAFTS

(71) Applicant: Goodrich Corporation, Charlotte, NC (US)

(72) Inventors: Chethana Shivappa, Bangalore (IN); Bhavamanyu Aman Saxena, Bangalore (IN)

(73) Assignee: GOODRICH CORPORATION, Charlotte, NC (US)

( * ) Notice: Subject to any disclaimer, the term of this patent is extended or adjusted under 35 U.S.C. 154(b) by 126 days.

(21) Appl. No.: 18/472,041

(22) Filed: Sep. 21, 2023

(65) Prior Publication Data

US 2025/0033781 A1     Jan. 30, 2025

(30) Foreign Application Priority Data

Jul. 28, 2023    (IN) ............................. 202341050978

(51) Int. Cl.
     B64D 25/14      (2006.01)
(52) U.S. Cl.
     CPC ................... *B64D 25/14* (2013.01)
(58) Field of Classification Search
     None
     See application file for complete search history.

(56) References Cited

U.S. PATENT DOCUMENTS

| | | | |
|---|---|---|---|
| 3,465,991 A * | 9/1969 | Banas | B64D 25/14 193/25 B |
| 11,572,181 B2 | 2/2023 | John et al. | |
| 2008/0099621 A1 | 5/2008 | Hintzman | |
| 2017/0050737 A1 | 2/2017 | Hartman et al. | |
| 2022/0402618 A1 | 12/2022 | Palaniappan et al. | |
| 2023/0097188 A1 | 3/2023 | Mugeraya et al. | |
| 2023/0174243 A1 | 6/2023 | Mugeraya et al. | |

FOREIGN PATENT DOCUMENTS

EP           4105127      12/2022

OTHER PUBLICATIONS

European Patent Office, European Search Report dated Jan. 14, 2025 in Application No. 24190876.3.
Giovino, Bill, "RGB LEDs Provide Multicolor Display Solutions", DigiKey, Mar. 12, 2019, pp. 1-8, XP093230694, Retrieved from the Internet: URL: https://www.digikey.com/en/articles/how-to-drive-multicolor-leds, Retrieved Dec. 3, 2024.

* cited by examiner

*Primary Examiner* — William R Harp
(74) *Attorney, Agent, or Firm* — SNELL & WILMER L.L.P.

(57) ABSTRACT

A system for providing an indication of slide pack density is provided. The system includes a set of stretch sensors and a control unit coupled to the set of stretch sensors. The control unit is configured to receive an input from a stretch sensor in the set of stretch sensors; compare the input to a first predetermined threshold; and, responsive to the input meeting or exceeding the first predetermined threshold, transmit a signal that causes an indicator to illuminate, providing an alert associated with a condition of a slide pack.

18 Claims, 7 Drawing Sheets

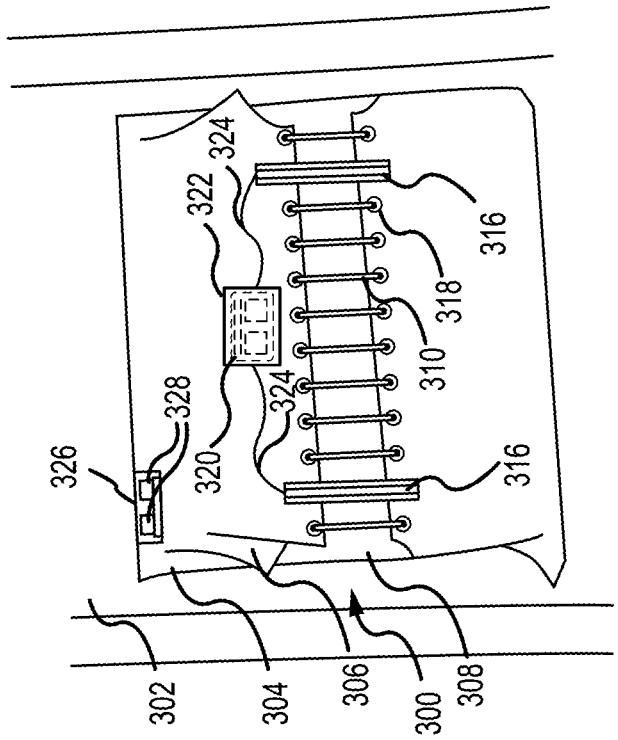
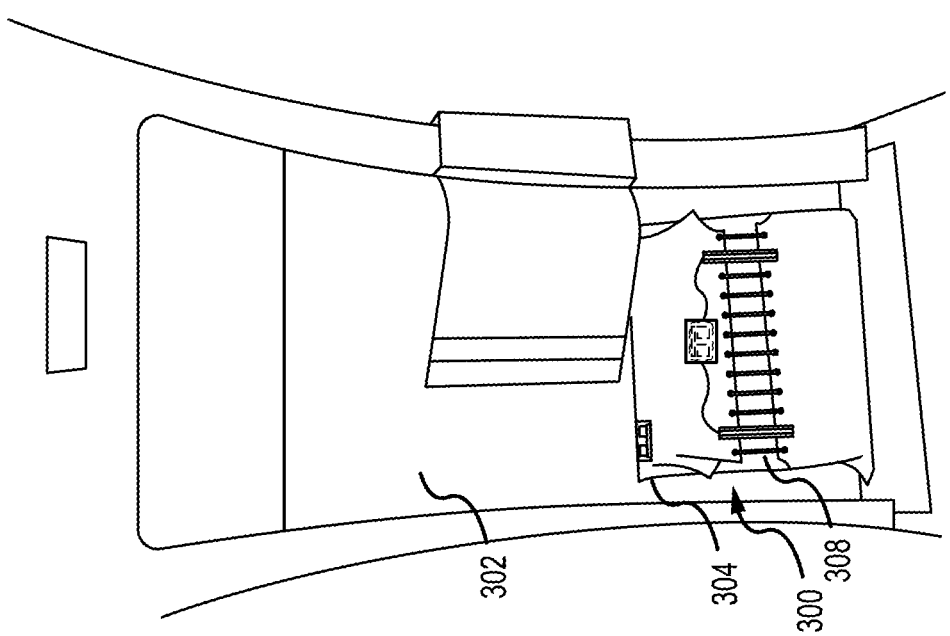

SLIDE PACK GROWTH DETECTION METHOD OF EVACUATION SLIDES OR SLIDE/RAFTS

CROSS-REFERENCE TO RELATED APPLICATIONS

This application claims priority to, and the benefit of, India Provisional Patent Application No. 202341050978, filed Jul. 28, 2023 and titled "SLIDE PACK GROWTH DETECTION METHOD OF EVACUATION SLIDES OR SLIDE/RAFTS," which is incorporated by reference herein in its entirety for all purposes.

FIELD

The present disclosure relates to systems and methods for evacuation systems, and more specifically, to a slide pack growth detection method of evacuation slides or slide/rafts.

BACKGROUND

Aircraft emergency landings often demand rapid evacuation of passengers from the aircraft due to potential injuries from fire, explosions, and sinking in water. Quickly evacuating passengers from an aircraft is performed with multiple emergency exits, each equipped with evacuation slides or slides/rafts. Evacuation slides or slides/rafts are needed to comply with aviation regulation and to ensure the safe evacuation of all passengers.

These evacuation slides or slides/rafts are typically stored in an uninflated condition in a packboard that occupies a small space in the interior of the aircraft. Door exit inflatable slides are typically mounted on the interior of the aircraft entry/exit door or immediately adjacent to it. Over wing exits are typically stored in an uninflated condition in a special packboard compartment that opens to the exterior of the aircraft adjacent the over wing exit.

SUMMARY

According to various embodiments of the present disclosure, a system for providing an indication of slide pack density is provided. The system includes a set of stretch sensors and a control unit coupled to the set of stretch sensors. The control unit is configured to receive an input from a stretch sensor in the set of stretch sensors, compare the input to a first predetermined threshold, and, responsive to the input meeting or exceeding the first predetermined threshold, transmit a signal that causes an indicator to illuminate, providing an alert associated with a condition of a slide pack.

In various embodiments, the system further includes a closer circuit in the control unit. In various embodiments, the control unit is configured to transmit the signal by closing the closer circuit in the control unit. In various embodiments, the system further includes an indicator unit coupled to the control unit. In various embodiments, the indicator unit is configured to receive the signal from the control unit; compare the signal to a second predetermined threshold; and, responsive to the signal meeting or exceeding the second predetermined threshold, transmit a further signal that causes the indicator to illuminate, providing the alert associated with the condition of the slide pack. In various embodiments, the system further includes a closer circuit in the indicator unit. In various embodiments, the indicator unit is configured to transmit the further signal by closing the closer circuit in the indicator unit.

In various embodiments, the second predetermined threshold is at least one of the same as the first predetermined threshold or different than the first predetermined threshold. In various embodiments, the indicator unit is wirelessly coupled to the control unit. In various embodiments, each stretch sensor of the set of stretch sensors is disposed over lacing retaining the slide pack within a soft cover. In various embodiments, each stretch sensor of the set of stretch sensors is anchored on either end to grommets through which the lacing is positioned. In various embodiments, the slide pack is located within a packboard compartment of an aircraft. In various embodiments, the slide pack is located within a compartment on an exit door of an aircraft.

Also disclosed herein is a control system for providing an indication of slide pack density. The control system includes a set of stretch sensors, a control unit coupled to the set of stretch sensors, and a first tangible, non-transitory memory configured to communicate with the control unit, the first tangible, non-transitory memory having instructions stored thereon. In response to execution by the control unit, cause the control unit to perform operations including receiving an input from a stretch sensor in the set of stretch sensors, comparing the input to a first predetermined threshold, and, responsive to the input meeting or exceeding the first predetermined threshold, transmitting a signal that causes an indicator to illuminate, providing an alert associated with a condition of a slide pack.

In various embodiments, the control system further incudes a closer circuit in the control unit. In various embodiments, the instructions further cause the control unit to close the closer circuit in the control unit in order to transmit the signal. In various embodiments, the control system further includes an indicator unit coupled to the control unit and a second tangible, non-transitory memory configured to communicate with the indicator unit, the second tangible, non-transitory memory having second instructions stored thereon. In various embodiments, in response to execution by the indicator unit, the instructions cause the indicator unit to perform operations including receiving the signal from the control unit; comparing the signal to a second predetermined threshold, and, responsive to the signal meeting or exceeding the second predetermined threshold, transmitting a further signal that causes the indicator to illuminate, providing the alert associated with the condition of the slide pack. In various embodiments, the control system further includes a closer circuit in the indicator unit. In various embodiments, the instructions further cause the indicator unit to close the closer circuit in the indicator unit in order to transmit the further signal.

In various embodiments, the second predetermined threshold is at least one of the same as the first predetermined threshold or different than the first predetermined threshold. In various embodiments, the indicator unit is wirelessly coupled to the control unit. In various embodiments, each stretch sensor of the set of stretch sensors is disposed over lacing retaining the slide pack within a soft cover. In various embodiments, each stretch sensor of the set of stretch sensors is anchored on either end to grommets through which the lacing is positioned. In various embodiments, the slide pack is located within at least one of a packboard compartment of an aircraft or a compartment on an exit door of the aircraft.

Also disclosed herein is a method for providing an indication of slide pack density. The method includes receiving, by a control unit, an input from a stretch sensor in a set of stretch sensors; comparing, by the control unit, the input to a first predetermined threshold; and, responsive to the input meeting or exceeding the first predetermined threshold, transmitting, by the control unit, a signal that causes an indicator to illuminate, providing an alert associated with a condition of a slide pack.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

FIGS. 3A and 3B illustrate an evacuation slide assembly, in accordance with various embodiments.

DETAILED DESCRIPTION

Figure 1:
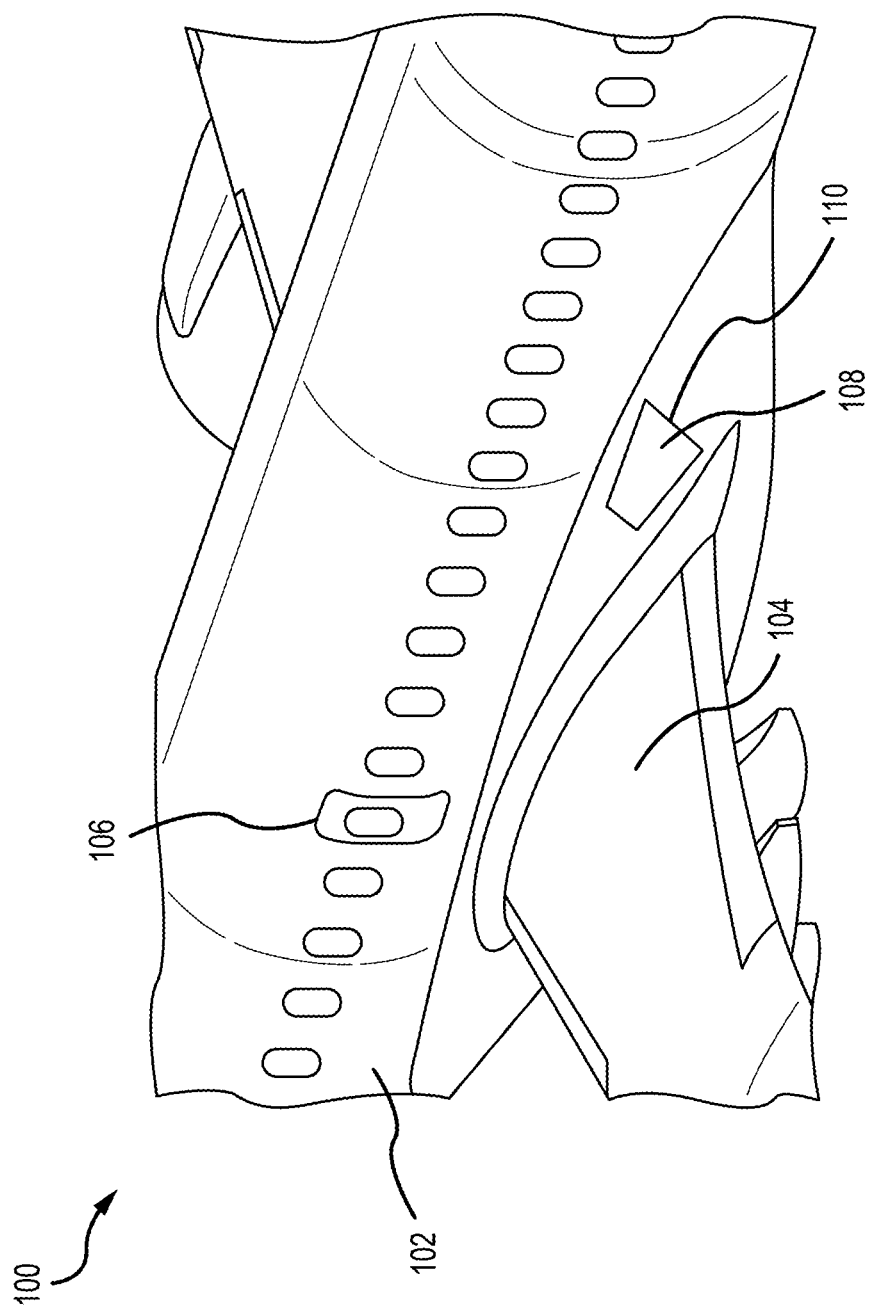
FIG. 1 illustrates an aircraft, in accordance with various embodiments.

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an," or "the" may include one or more than one and that reference to an item in the singular may also include the item in the plural. Further, all ranges may include upper and lower values and all ranges and ratio limits disclosed herein may be combined.

As stated previously, evacuation slides or slides/rafts are normally stored in an uninflated condition in a packboard that occupies a small space in the interior of the aircraft. Door exit inflatable slides are typically mounted on the interior of the aircraft door or immediately adjacent to the aircraft door. Over wing exits are typically stored in an uninflated condition in a special packboard compartment that opens to the exterior of the aircraft adjacent the over wing exit. Typically, there is little, if any, monitoring of the evacuation system slide or slide/raft units. In some instances, a failure to monitor an evacuation system slide or slide/raft units may result in adverse effects, such as being unavailable for usage during emergency, inadvertent deployment of evacuation system slide or slide/raft unit which may result in passenger safety concerns, among others.

Disclosed herein is a system and method for detecting slide pack or slides/rafts pack growth. In various embodiments, one or more stretch sensors are positioned over one or more laces of the valise or softcover in which the slide or slide/raft unit is retained. In various embodiments, each stretch sensor may be bonded or assembled over the packed unit and anchored on either end to the grommets through which the laces are positioned. In various embodiments, each stretch sensor is electronically and communicatively coupled to the controller. In various embodiments, each stretch sensor is powered by the power unit stored inside the control unit. In various embodiments, a control unit and transmitter may be positioned on or within a pocket of the valise or softcover. In various embodiments, each stretch sensor may be coupled to the control unit. In various embodiments, an indicator unit, with a visual indicator, may be visibly positioned on an exterior of the compartment. In various embodiments, the indicator unit may be configured to display a first visual indication until a signal is received from the control unit. In various embodiments, the receiver is communicatively coupled to the transmitter of the control unit, i.e. a wireless connection. In various embodiments, the stretch sensor periodically or continuously sends a stretch indication of the deformation and/or stretching forces, such as tension, associated with the slide pack or slides/rafts pack. In various embodiments, the control unit receives the stretch indication from the stretch sensor and compares the stretch indication to a predetermined threshold. In various embodiments, responsive to the stretch indication meeting or exceeding the predetermined threshold, based on implementation, the control unit transmits a signal to the receiver and the indicator unit provides a second visual indication of the status of the slide pack or slides/rafts pack. By providing an indication of the status of the slide pack or slides/rafts pack, in various embodiments, the proposed system and method provides real time data and increases the safety of the system. In that regard, in various embodiments, the real time data may reduce and/or prevent inadvertent deployment of the slide or slide/raft and ensure a properly working of slide or slide/raft unit during emergency condition.

Referring now to FIG. 1, an exemplary aircraft is illustrated, in accordance with various embodiments. The aircraft 100 may include a fuselage 102 with wings 104 fixed to fuselage 102. Emergency exit door 106 may be disposed on the fuselage 102 over the wings 104 such that passengers exiting the emergency exit door 106 would exit onto wings 104. An evacuation slide assembly 108 may be disposed aft of emergency exit door 106. Blowout panel 110 may cover the evacuation slide assembly 108 when installed on the aircraft 100. In various embodiments, the evacuation slide assembly 108 may include and/or be housed within a packboard compartment of the aircraft 100.

The evacuation slide assembly 108 may jettison the blowout panel 110 and deploy an evacuation slide, such as an inflatable slide, in response to activating the emergency exit door 106 opening or in response to another evacuation event. The evacuation slide may be packed within and/or otherwise stored and/or retained within a soft cover. As described in greater detail below, the evacuation slide assembly 108 may include a release system that facilitates the deployment of the evacuation slide and the release of both the blowout panel 110 and the soft cover. In various embodiments, as described in greater detail below, the release system may be actuated using a single power source, such as a magnetostriction component. In various embodiments, actuation of the release system, and thus deployment of the evacuation slide and the deployment/release of both the blowout panel 110 and the soft cover, may be non-electrically actuated.

Figure 2:
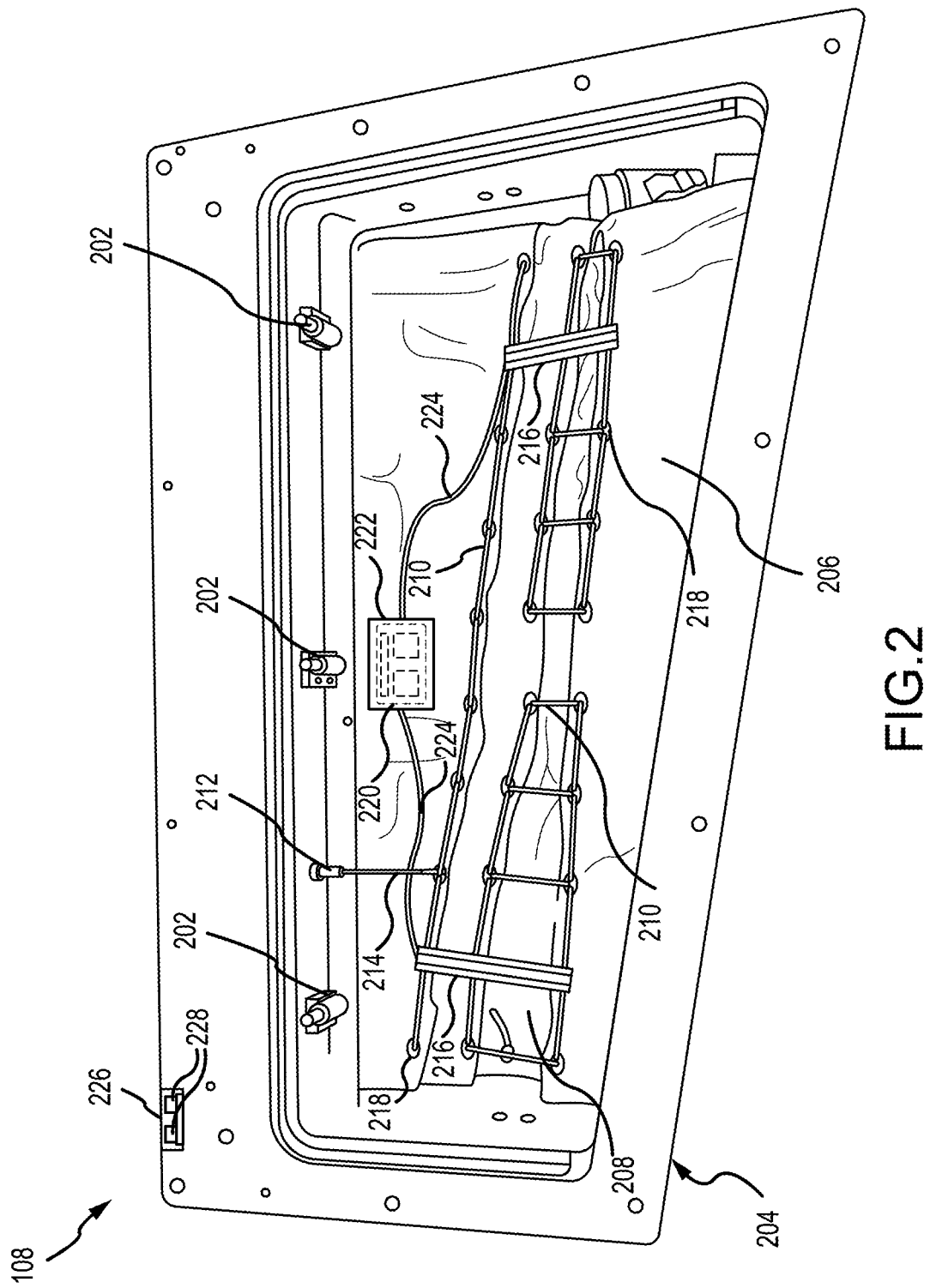
FIG. 2 illustrates an evacuation slide assembly, in accordance with various embodiments.

Referring now to FIG. 2, an evacuation slide assembly is illustrated, in accordance with various embodiments. In various embodiments, a first actuator 202 is configured to release the blowout panel 110 of the evacuation slide assembly 108 of FIG. 1 in response to an evacuation event. That is, according to various embodiments, the blowout panel 110 may be at least partially retained in place by the first actuator 202 until an evacuation event. In response to the evacuation event, the first actuator 202 may release the blowout panel 110, thus allowing the blowout panel 110 to be jettisoned, in accordance with various embodiments. In various embodiments, the act of jettisoning of the blowout panel 110 may be accomplished indirectly via inflation of the evacuation slide.

In various embodiments, the first actuator 202 may include multiple actuators spaced apart from each other and distributed along a length of the packboard compartment 204. In various embodiments, the first actuator 202 or first actuators may be ball locks. The ball locks may engage a lip or other surface of the blowout panel 110 and thus may securely retain, or at least facilitate retaining, the blowout panel 110 in place over an opening to the packboard compartment 204. In response to an evacuation event, the first actuator 202 or first actuators release the blowout panel 110.

The packboard compartment 204 may include a soft cover 206 containing evacuation slide 208. Soft cover 206 may have lacing 210 to enclose the soft cover 206 and to retain the evacuation slide 208. The lacing 210 may be in a daisy chain or speed lacing configuration. The lacing 210 may have a key-loop that, once released or unlocked, allows the remainder of the lacing 210 to be unfurled. Thus, in response to releasing the key-loop, the evacuation slide 208 may be released (or may at least be releasable).

In various embodiments, a second actuator 212 may be coupled to the lacing 210 and motivation of the second actuator 212, in response to an evacuation event, may unlock the key-loop or other such feature of the lacing 210, thereby allowing the lacing 210 to be unfurled. In various embodiments, the lacing 210 may include a pin that locks the key-loop. The pin may be slidably coupled to the lacing 210 and may be coupled to the second actuator 212. Movement of the second actuator 212 may cause the pin 214 to translate or slide into the second actuator 212, thus unlocking the lacing 210.

The second actuator 212 may also include an arm that is configured to couple to the key-loop or pin of the lacing 210. The arm of the second actuator 212 may be in an extended position when an evacuation event is not occurring or when the evacuation system is disarmed. When the evacuation system is armed, in response to an evacuation event, the arm of the second actuator 212 retracts into a housing, thus sliding the pin or otherwise unlocking the key-loop of the lacing 210 to allow the lacing 210 to unfurl and release the evacuation slide 208 from the soft cover 206.

In accordance with various embodiments, a set of stretch sensors 216 are configured to be positioned over one or more portions of the lacing 210 and/or soft cover 206 in which evacuation slide 208 is retained. In various embodiments, each stretch sensor of the set of stretch sensors 216 may be bonded or assembled over the packed evacuation slide 208 and anchored on either end to grommets 218 through which the lacing 210 is positioned. In various embodiments, a control unit 220 may be positioned on or within a pocket 222 of the soft cover 206. In various embodiments, the pocket 222 may be a waterproof case. In various embodiments, the control unit may be configured with a transmitter. In various embodiments, each stretch sensor of the set of stretch sensors 216 may be electrically and communicatively coupled to the control unit 220 via cables 224. In various embodiments, an indicator unit 226, with visual indicators 228, may be visibly positioned on an exterior of the packboard compartment 204. In various embodiments, the indicator unit 226, with the visual indicators 228, may be visibly positioned on an interior of the aircraft over or near to a wing exit door with which the evacuation slide 208 is associated. In various embodiments, the indicator unit 226 may be encased in a waterproof case. In various embodiments, the indicator unit 226 may be configured to display a first visual indication until a signal is received from the control unit 220. In that regard, in various embodiments, the indicator unit 226 may be configured with a receiver. In various embodiments, the receiver in the indicator unit 226 is communicatively coupled to the transmitter in the control unit 220. In various embodiments, each stretch sensor of the set of stretch sensors 216 periodically or continuously sends a stretch indication of the deformation and/or stretching forces, such as tension, associated with the packed evacuation slide 208, i.e. forces applied by the packed evacuation slide 208 to the lacing 210 and/or soft cover 206.

In various embodiments, the control unit 220 receives the stretch indication from each stretch sensor in the set of stretch sensors 216 and compares the stretch indication to a predetermined threshold. In various embodiments, responsive to the stretch indication meeting or exceeding or the predetermined threshold, based on implementation, the control unit 220 transmits a signal via the transmitter to the receiver in the indicator unit 226. In various embodiments, responsive to receiving the signal, the indicator unit 226 provides a second visual indication of the status of the packed evacuation slide 208.

Referring now to FIGS. 3A and 3B, an evacuation slide assembly is illustrated, in accordance with various embodiments. The evacuation slide assembly 300 includes a door exit evacuation slide 308 stored in an uninflated condition within a compartment 304 on an aircraft entry/exit door 302. While FIG. 3A illustrates the door exit evacuation slide 308 mounted on the interior of the aircraft entry/exit door 302, in various embodiments, the door exit evacuation slide 308 may be mounted immediately adjacent to the interior of the aircraft entry/exit door 302. The compartment 304 may include a soft cover 306 containing the door exit evacuation slide 308. Soft cover 306 may have lacing 310 to enclose the soft cover 306 and to retain the door exit evacuation slide 308. The lacing 310 may be in a daisy chain or speed lacing configuration. The lacing 310 may have a key-loop that, once released or unlocked, allows the remainder of the lacing 310 to be unfurled. Thus, in response to releasing the key-loop, the door exit evacuation slide 308 may be released (or may at least be releasable).

In accordance with various embodiments, a set of stretch sensors 316 are configured to be positioned over one or more portions of the lacing 310 and/or soft cover 306 in which the door exit evacuation slide 308 is retained. In various embodiments, each stretch sensor of the set of stretch sensors 316 may be bonded or assembled over the packed door exit evacuation slide 308 and anchored on either end to grommets 318 through which the lacing 310 is positioned. In various embodiments, a control unit 320 may be positioned on or within a pocket 322 of the soft cover 306. In various embodiments, the pocket 322 may be a waterproof case. In various embodiments, the control unit may be configured with a transmitter. In various embodiments, each stretch sensor of the set of stretch sensors 316 may be electrically and communicatively coupled to the control unit 320 via cables 324. In various embodiments, an indicator unit 326, with visual indicators 328, may be visibly positioned on an exterior of the compartment 304. In various embodiments, the indicator unit 326 may be encased in a waterproof case. In various embodiments, the indicator unit 326 may be configured to display a first visual indication until a signal is received from the control unit 320. In that regard, in various embodiments, the indicator unit 326 may be configured with a receiver. In various embodiments, the receiver in the indicator unit 326 is communicatively coupled to the transmitter in the control unit 320. In various embodiments, each stretch sensor of the set of stretch sensors 316 periodically or continuously send a stretch indication of the deformation and/or stretching forces, such as tension, associated with the packed door exit evacuation slide 308, i.e. forces applied by the packed door exit evacuation slide 308 to the lacing 310 and/or soft cover 306.

In various embodiments, the control unit 320 receives the stretch indication from each stretch sensor in the set of stretch sensors 316 and compares the stretch indication to a predetermined threshold. In various embodiments, responsive to the stretch indication meeting or exceeding the predetermined threshold, based on implementation, the control unit 320 transmits a signal via the transmitter to the receiver in the indicator unit 326. In various embodiments, responsive to receiving the signal, the indicator unit 326 provides a second visual indication of the status of the packed door exit evacuation slide 308.

Figure 4:
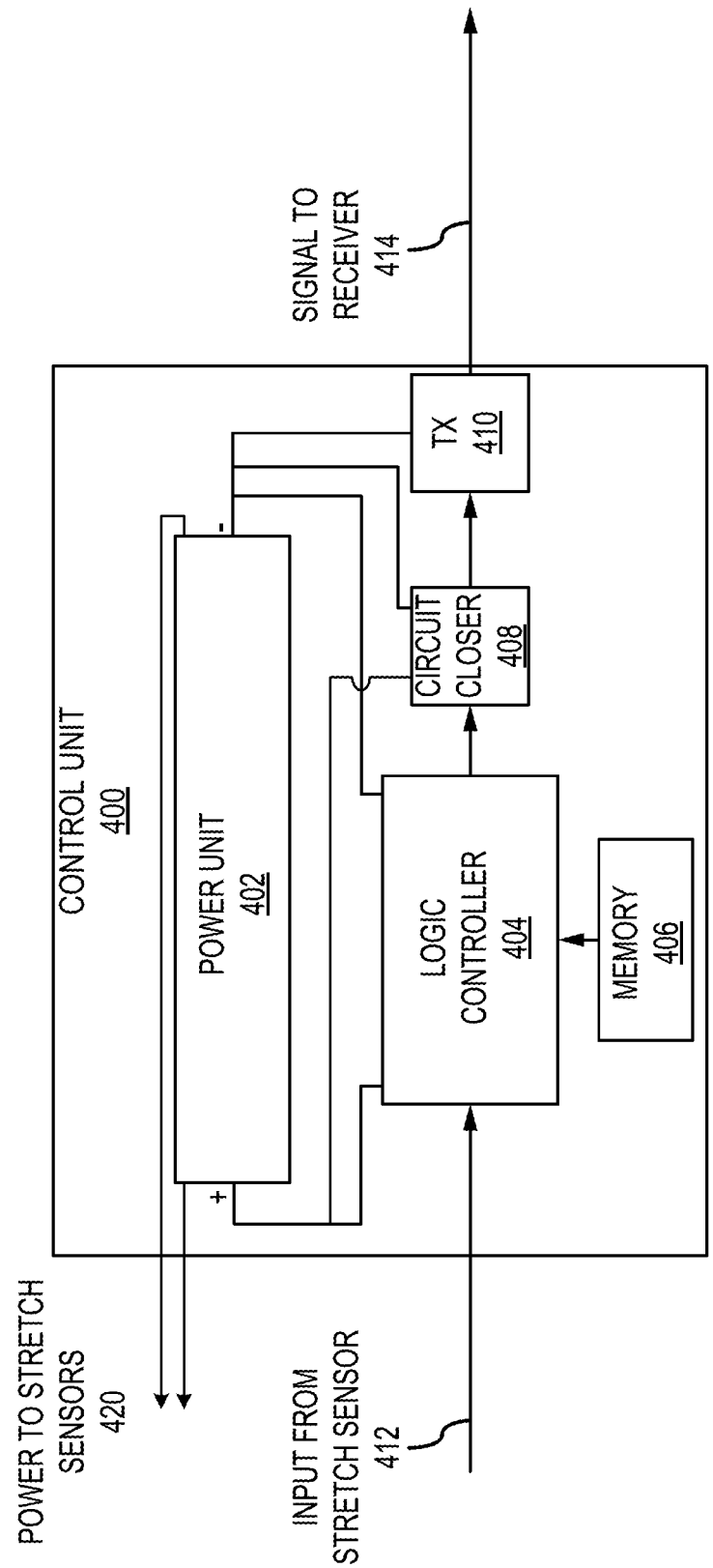
FIG. 4 illustrates a functional block diagram of a control unit, in accordance with various embodiments.

Referring now to FIG. 4, a functional block diagram of a control unit is illustrated, in accordance with various embodiments. In various embodiments, the control unit 400 may be a control unit such as the control unit 220 of FIG. 2 or the control unit 320 of FIGS. 3A and 3B. In various embodiments, the control unit 400 includes power unit 402, logic controller 404, memory 406, circuit closer 408, and transmitter 410. In various embodiments, the power unit 402 is configured to provide power to the logic controller 404, the circuit closer 408, and the transmitter 410. In various embodiments, the power unit 402 may also provide power 420 to each stretch sensor, such as stretch sensor 216 of FIG. 2 or stretch sensor 316 of FIG. 3. In various embodiments, the logic controller 404 is electrically and communicatively coupled to the circuit closer 408 and the circuit closer 408 is electrically and communicatively coupled to the transmitter 410. In various embodiments, the circuit closer 408 is electrically and communicatively coupled to the transmitter 410 in an open circuit condition.

In various embodiments, as the stretch sensor stretch due to, for example, an increase in distance between grommets, i.e. deformation and/or stretching forces, such as tension, the logic controller 404 is configured to receive the input from the stretch sensor 412 as a stretch indication. In various embodiments, the memory 406 stores a predetermined threshold, i.e. a predefined stretch value for alert. In various embodiments, the memory 406 may be communicatively coupled to the logic controller 404. In various embodiments, the logic controller 404 is configured to retrieve the predetermined threshold from the memory 406 and compare the stretch indication to the predetermined threshold.

In various embodiments, responsive to the stretch indication meeting or exceeding the predetermined threshold, based on implementation, the logic controller 404 is configured to send a signal to the circuit closer 408. In various embodiments, the circuit closer 408 is configured to close upon receiving the signal from the logic controller 404, which provide for the transmitter 410 to transmit. In that regard, upon the circuit closer 408 closing, the transmitter 410 is configured to wirelessly transmit the signal to the receiver 414 in the indicator unit, such as the indicator unit 226 of FIG. 2 or the indicator unit 326 of FIGS. 3A and 3B.

Figure 5:
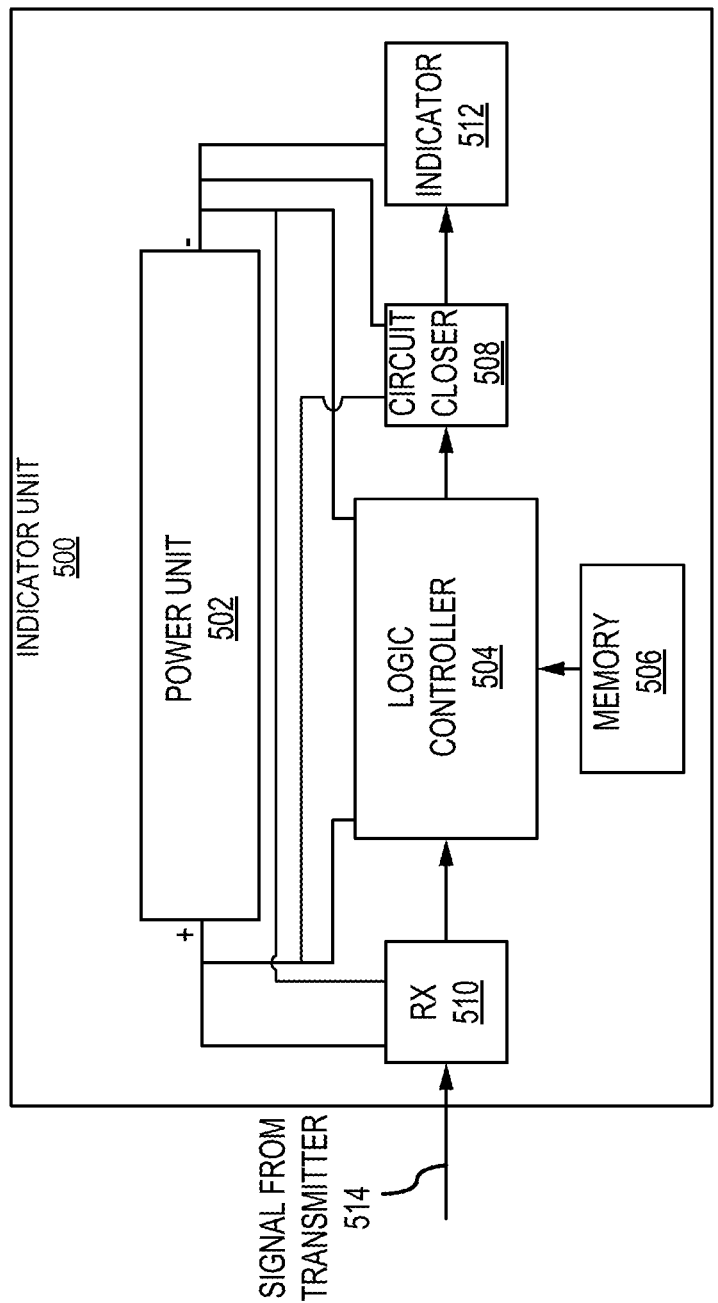
FIG. 5 illustrates a functional block diagram of an indicator unit, according to various embodiments.

Referring now to FIG. 5, a functional block diagram of an indicator unit is illustrated, in accordance with various embodiments. In various embodiments, the indicator unit 500 may be an indicator unit such as the indicator unit 226 of FIG. 2 or the indicator unit 326 of FIGS. 3A and 3B. In various embodiments, the indicator unit 500 includes power unit 502, logic controller 504, memory 506, circuit closer 508, receiver 510, and indicator 512.

In various embodiments, the power unit 502 is configured to provide power to the logic controller 504, the circuit closer 508, and the receiver 510. In various embodiments, the receiver 510 is electrically and communicatively coupled to the logic controller 504, the logic controller 504 is electrically and communicatively coupled to the circuit closer 508, and the circuit closer 508 is electrically and communicatively coupled to the indicator 512. In various embodiments, the circuit closer 508 is electrically and communicatively coupled to the indicator 512 in an open circuit condition.

In various embodiments, the receiver 510 is configured to be in an 'on' condition to wirelessly receive signals from a transmitter, such as transmitter 410 of FIG. 4. In various embodiments, responsive to receiving a signal from the transmitter 514, the receiver 510 is configured to relay the signal to the logic controller 504. In various embodiments, the memory 506 stores the predetermined threshold, i.e. a user-predefined stretch value for alert. In various embodiment, both memory 506 and memory 406 of FIG. 4 store the same predetermined value. In various embodiment, both memory 506 and memory 406 of FIG. 4 store a different predetermined value. In various embodiments, the memory 506 may be communicatively coupled to the logic controller 504. In various embodiments, the logic controller 504 is configured to retrieve the predetermined threshold from the memory 506 and compare the received signal to the predetermined threshold, as a dual verification process.

In various embodiments, responsive to the received signal meeting or exceeding the predetermined threshold, based on implementation, the logic controller 504 is configured to send a signal to the circuit closer 508. In various embodiments, the circuit closer 508 is configured to close upon receiving the signal from the logic controller 504, which provides for the indicator 512 to illuminate, alerting the crew members present on the aircraft of the condition of the evacuation slide or the door exit evacuation slide.

Figure 6:
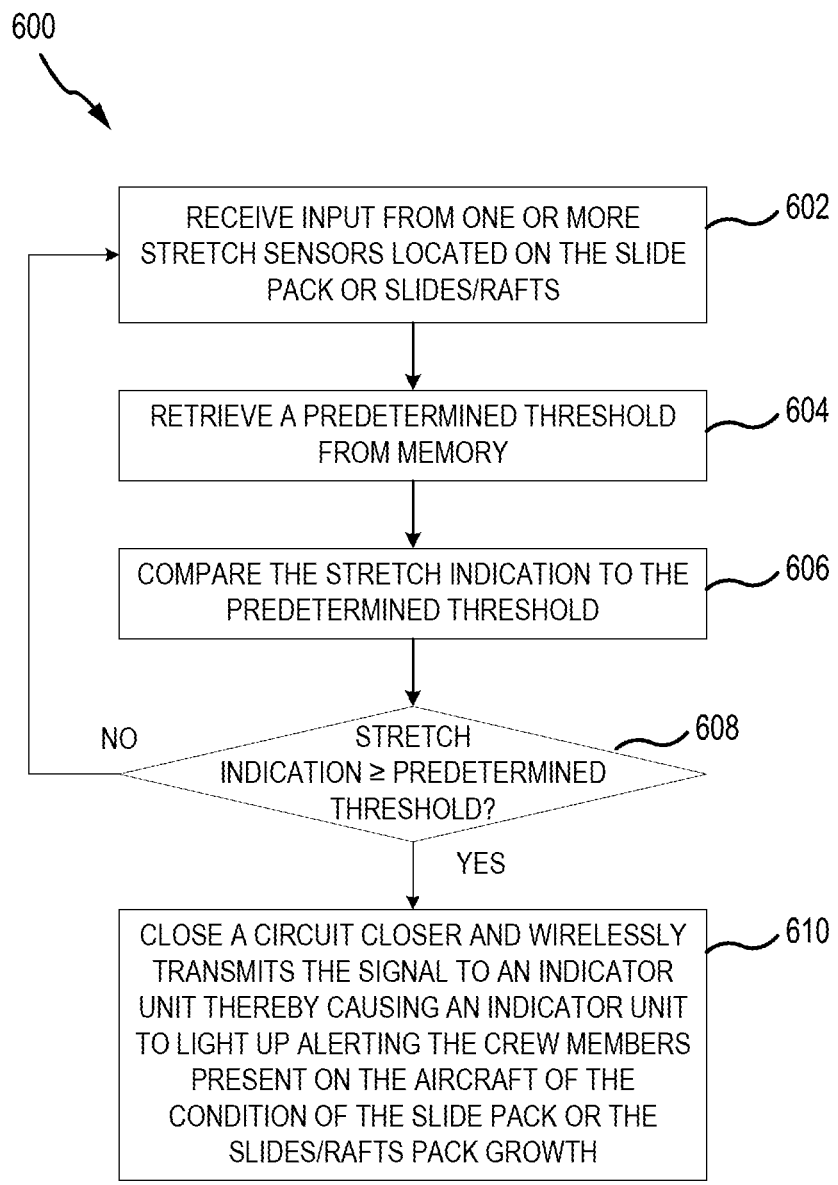
FIG. 6 illustrates a method for detecting slide pack or slides/rafts pack growth and providing an indication thereof sickness, in accordance with various embodiments.

Referring now to FIG. 6, in accordance with various embodiments, a method 600 for detecting slide pack or slides/rafts pack growth and providing an indication thereof sickness is illustrated. The method 600 may be performed by a control unit such as control unit 220 of FIG. 2, control unit 320 of FIGS. 3A and 3B, or control unit 400 of FIG. 4. At block 602, the control unit receives input from one or more stretch sensors located on the slide pack or slides/rafts, the input providing a stretch indication. At block 604, the control unit retrieves a predetermined threshold from memory and, at block 606, the control unit compares the stretch indication to the predetermined threshold. At block 608, the control unit determines whether the stretch indication meets or exceeds the predetermined threshold. If at block 608, the stretch indication meets or exceeds the predetermined threshold, based on implementation, at block 610, the control unit closes a circuit closer and wirelessly transmits the signal to an indicator unit, which causes an indicator unit to illuminate, alerting the crew members present on the aircraft of the condition of the slide pack or the slides/rafts pack growth. If at block 608, the stretch indication fails to meet or exceed the predetermined threshold, based on implementation, the operation returns to block 602 to wait for another input.

Figure 7:
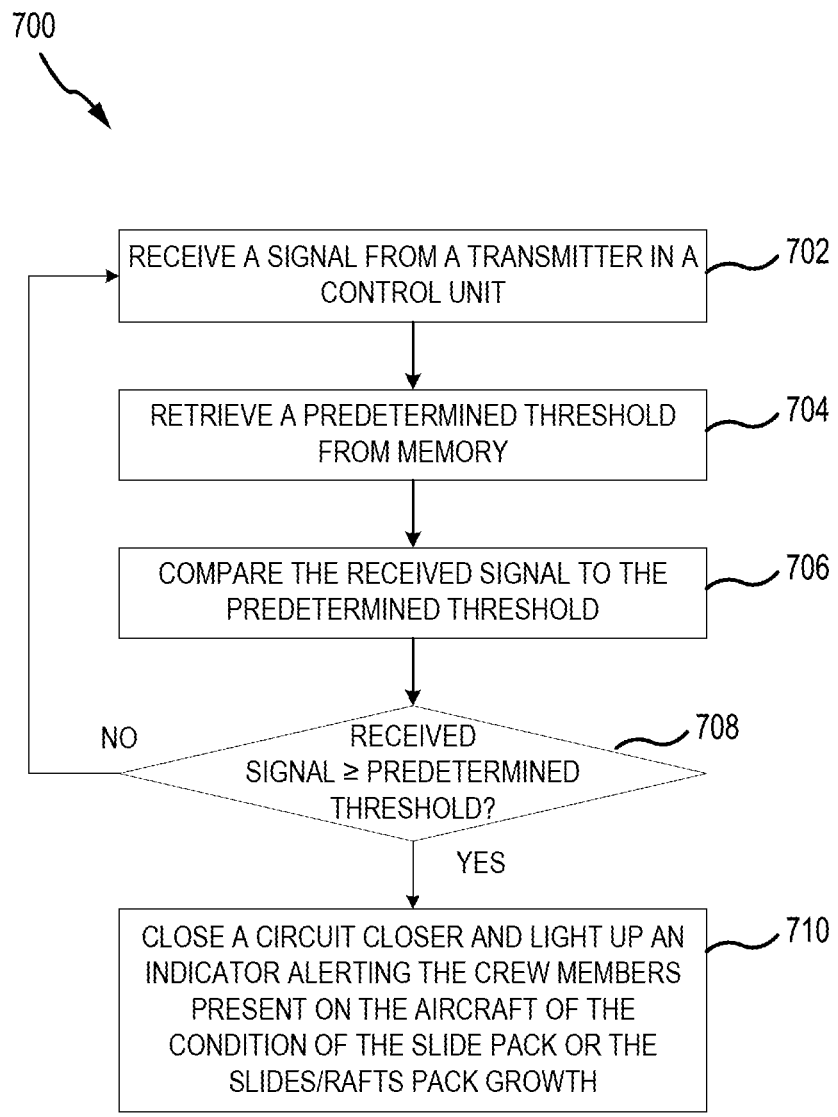
FIG. 7 illustrates a method for detecting slide pack or slides/rafts pack growth and providing an indication thereof sickness, in accordance with various embodiments.

Referring now to FIG. 7, in accordance with various embodiments, a method 700 for detecting slide pack or slides/rafts pack growth and providing an indication thereof sickness is illustrated. The method 700 may be performed by an indicator unit such as indicator unit 226 of FIG. 2, indicator unit 326 of FIGS. 3A and 3B, or indicator unit 500 of FIG. 4. At block 702, the indicator unit receives a signal from a transmitter in a control unit. At block 704, the control unit retrieves a predetermined threshold from memory and, at block 706, the control unit compares the received signal, to the predetermined threshold. At block 708, the control unit determines whether the received signal meets or exceeds the predetermined threshold thereby providing a dual verification process. If at block 708, the received signal meets or exceeds the predetermined threshold, based on implementation, at block 710, the control unit closes a circuit closer and lights up an indicator alerting the crew members present on the aircraft of the condition of the slide pack or the slides/rafts pack growth. If at block 708, the received signal fails to meet or exceed the predetermined threshold, based on implementation, the operation returns to block 702 to wait for another signal.

By providing an indication of the status of the slide pack or slides/rafts pack, in various embodiments, the proposed system and method provides real time data and increases the safety of the system. In that regard, in various embodiments, the real time data may reduce and/or prevent inadvertent deployment of the slide or slide/raft and ensure a properly working of slide or slide/raft unit during emergency condition. That is, the provided pack density detection system is configured to provide an alert to crew members as to the pack growth of the slide or slide/raft assembly. Providing the alert may empower the crew members to take immediate action to avoid inadvertent deployment of the slide or slide/raft assembly. Accordingly, the proposed system and method ensures that the slide or slide/raft assembly will be in operating condition at any given point of time.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods, and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 10%, within 5%, within 1%, within 0.1%, or within 0.01% of a stated value. Additionally, the terms "substantially," "about," or "approximately" as used herein represent an amount close to the stated amount that still performs a desired function or achieves a desired result. For example, the term "substantially," "about," or "approximately" may refer to an amount that is within 10% of, within 5% of, within 1% of, within 0.1% of, and within 0.01% of a stated amount or value.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above-described concepts can be used alone or in combination with any or all of the other above-described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A system for providing an indication of slide pack density, the system comprising:
    a set of stretch sensors;
    a soft cover; and
    a control unit coupled to the set of stretch sensors, wherein the control unit is configured to:
        receive an input from a stretch sensor in the set of stretch sensors;
        compare the input to a first predetermined threshold; and
        responsive to the input meeting or exceeding the first predetermined threshold, transmit a signal that causes an indicator to illuminate, providing an alert associated with a condition of a slide pack,
        wherein each stretch sensor of the set of stretch sensors is disposed over lacing retaining the slide pack within the soft cover.

2. The system of claim 1, further comprising:
    a closer circuit in the control unit, wherein the control unit is configured to transmit the signal by closing the closer circuit in the control unit.

3. The system of claim 1, further comprising:
    an indicator unit coupled to the control unit, wherein the indicator unit is configured to:
        receive the signal from the control unit;
        compare the signal to a second predetermined threshold; and
        responsive to the signal meeting or exceeding the second predetermined threshold, transmit a further signal that causes the indicator to illuminate, providing the alert associated with the condition of the slide pack.

4. The system of claim 3, further comprising:
    a closer circuit in the indicator unit, wherein the indicator unit is configured to transmit the further signal by closing the closer circuit in the indicator unit.

5. The system of claim 3, wherein the second predetermined threshold is at least one of the same as the first predetermined threshold or different than the first predetermined threshold.

6. The system of claim 3, wherein the indicator unit is wirelessly coupled to the control unit.

7. The system of claim 1, wherein each stretch sensor of the set of stretch sensors is anchored on either end to a set of grommets through which the lacing is positioned.

8. The system of claim 1, wherein the slide pack is located within a packboard compartment of an aircraft.

9. The system of claim 1, wherein the slide pack is located within a compartment on an exit door of an aircraft.

10. A control system for providing an indication of slide pack density, the control system comprising:
    a set of stretch sensors;
    a control unit coupled to the set of stretch sensors; and
    a first tangible, non-transitory memory configured to communicate with the control unit, the first tangible, non-transitory memory having instructions stored thereon that, in response to execution by the control unit, cause the control unit to perform operations comprising:
        receiving an input from a stretch sensor in the set of stretch sensors;
        comparing the input to a first predetermined threshold; and
        responsive to the input meeting or exceeding the first predetermined threshold, transmitting a signal that causes an indicator to illuminate, providing an alert associated with a condition of a slide pack,
        wherein each stretch sensor of the set of stretch sensors is disposed over lacing retaining the slide pack within a soft cover.

11. The control system of claim 10, further comprising:
    a closer circuit in the control unit, wherein the instructions further cause the control unit to close the closer circuit in the control unit in order to transmit the signal.

12. The control system of claim 10, further comprising:
    an indicator unit coupled to the control unit; and
    a second tangible, non-transitory memory configured to communicate with the indicator unit, the second tangible, non-transitory memory having second instructions stored thereon that, in response to execution by the indicator unit, cause the indicator unit to perform the operations comprising:
        receiving the signal from the control unit;
        comparing the signal to a second predetermined threshold; and
        responsive to the signal meeting or exceeding the second predetermined threshold, transmitting a further signal that causes the indicator to illuminate, providing the alert associated with the condition of the slide pack.

13. The control system of claim 12, further comprising:
    a closer circuit in the indicator unit, wherein the instructions further cause the indicator unit to close the closer circuit in the indicator unit in order to transmit the further signal.

14. The control system of claim 12, wherein the second predetermined threshold is at least one of the same as the first predetermined threshold or different than the first predetermined threshold.

15. The control system of claim 12, wherein the indicator unit is wirelessly coupled to the control unit.

16. The control system of claim 10, wherein each stretch sensor of the set of stretch sensors is anchored on either end to a set of grommets through which the lacing is positioned.

17. The control system of claim 10, wherein the slide pack is located within at least one of a packboard compartment of an aircraft or a compartment on an exit door of the aircraft.

18. A method for providing an indication of slide pack density, the method comprising:
    receiving, by a control unit, an input from a stretch sensor in a set of stretch sensors;
    comparing, by the control unit, the input to a first predetermined threshold; and
    responsive to the input meeting or exceeding the first predetermined threshold, transmitting, by the control unit, a signal that causes an indicator to illuminate, providing an alert associated with a condition of a slide pack,
    wherein each stretch sensor of the set of stretch sensors is disposed over lacing retaining the slide pack within a soft cover.

* * * * *